US008340143B2

(12) United States Patent
Fan et al.

(10) Patent No.: US 8,340,143 B2
(45) Date of Patent: Dec. 25, 2012

(54) PASSIVELY MODE-LOCKED PICOSECOND LASER DEVICE

(75) Inventors: Zhongwei Fan, Beijing (CN); Yunfeng Ma, Beijing (CN); Gang Niu, Beijing (CN)

(73) Assignee: Beijing GK Laser Technology Co., Ltd., Beijing (CN)

( * ) Notice: Subject to any disclaimer, the term of this patent is extended or adjusted under 35 U.S.C. 154(b) by 0 days.

(21) Appl. No.: 12/669,951

(22) PCT Filed: Aug. 20, 2009

(86) PCT No.: PCT/CN2009/073378
§ 371 (c)(1),
(2), (4) Date: Jan. 20, 2010

(87) PCT Pub. No.: WO2010/127521
PCT Pub. Date: Nov. 11, 2010

(65) Prior Publication Data
US 2012/0039345 A1    Feb. 16, 2012

(30) Foreign Application Priority Data

May 4, 2009    (CN) .......................... 2009 1 0083431

(51) Int. Cl.
*H01S 3/098* (2006.01)
(52) U.S. Cl. .......................... 372/18; 372/99
(58) Field of Classification Search .............. 372/18, 372/99
See application file for complete search history.

(56) References Cited

U.S. PATENT DOCUMENTS 4,101,846 A * 7/1978 Fein et al. .................. 372/87
4,653,063 A * 3/1987 Acharekar et al. .......... 372/107
5,870,415 A * 2/1999 Tsunekane ................... 372/22
6,212,216 B1 * 4/2001 Pillai ............................ 372/96
6,834,064 B1   12/2004 Paschotta et al.

(Continued)

FOREIGN PATENT DOCUMENTS

CN    2754243 Y    1/2006

(Continued)

OTHER PUBLICATIONS

Cai, Zhiqiang et al., End-pumped all-solid-state picosecond passively mode-locking laser, Chinese Journal of Lasers, Jul. 2007, vol. 34, Issue 7.

(Continued)

*Primary Examiner* — Tod T Van Roy
(74) *Attorney, Agent, or Firm* — Knobbe Martens Olson & Bear LLP

(57) ABSTRACT

A passively mode-locked picosecond laser device comprising a pump source, a laser crystal, a laser cavity, a mode-locked output structure is provided. In the device, the pump source is placed at the side of the incident end surface of the laser crystal; the laser cavity includes a plane reflective mirror and a first plano-concave mirror, the reflective mirror is placed opposite to the concave surface of the plano-concave mirror and located on the position of the focal radius of the plano-concave mirror. The normal direction of the reflective mirror and the axis of the plano-concave mirror form a small angle therebetween; the laser generated from the laser crystal oscillates in the laser cavity, and output through the mode-locked output structure. The device uses a stable cavity design of the equivalent confocal cavity, which can increase the optical path, reduce the repetition frequency, and significantly reduce the cavity length and volume.

7 Claims, 2 Drawing Sheets

U.S. PATENT DOCUMENTS

| | | | |
|---|---|---|---|
| 2005/0047470 A1* | 3/2005 | Ohtsuka et al. | 372/75 |
| 2006/0193362 A1* | 8/2006 | Kopf et al. | 372/93 |
| 2008/0317074 A1* | 12/2008 | Adachi et al. | 372/18 |
| 2009/0316737 A1* | 12/2009 | Kasamatsu et al. | 372/18 |

FOREIGN PATENT DOCUMENTS

| | | |
|---|---|---|
| CN | 2765348 Y | 3/2006 |
| CN | 1979978 A | 6/2007 |
| CN | 101399426 A | 4/2009 |
| EP | 0798825 B1 | 5/2003 |
| EP | 2043206 A2 | 4/2009 |

OTHER PUBLICATIONS

International Search Report dated Feb. 11, 2010, for International Application No. PCT/CN2009/073378.

Liu, H. et al., 5.1-ps passively mode-locked Nd:$Gd_{0.42}Y_{0.58}VO_4$ laser with a LT-GaAs absorber, Chinese Optics Letters, May 10, 2008, vol. 6, Issue 5.

* cited by examiner

PASSIVELY MODE-LOCKED PICOSECOND LASER DEVICE

This application is U.S. National Phase of International Application PCT/CN2009/073378, filed Aug. 20, 2009 designating the U.S, which claims priority to Chinese Patent Application No. 200910083431.8, filed May 4, 2009. The International Application, which was filed in Chinese, has not been published as of the 371 date of the national phase application.

FIELD OF THE INVENTION

The present invention relates to an ultra-short pulse laser device, and particularly to a passive mode-locked picosecond laser device.

BACKGROUND OF THE INVENTION

With the rapid development of laser technology and the increasing application demand thereof, the tendency of laser field is to realize the high-power, high beam quality, high efficiency, high stability and long life of a laser device which is in small size, compact structure, stable performance, and all solid state. In a variety of technical fields and industries, the demand for ultra short pulse laser is increasingly higher, especially for the picosecond laser, which has more application prospect than a femtosecond laser (for example, the fields of the national defense, industrial, medical, biological, and other areas). Therefore, a current important research task is to develop a high-quality, high efficiency, high stability picosecond laser.

According to one existing picosecond laser technology, a dye mode-locked, is utilized, for example, a published Chinese patent application No. 03114621.X, entitled as "high light-output time stability passive mode-locked Nd:YAG picosecond laser device" which has complex and bulky electronic control system. Also, the dye, being of highly toxic, would be diluted after some time, so needs to be replaced, therefore the life time is short which is not facilitated for industrialization and human health. According to another existing mode-locked picosecond laser device technology, active mode-locked technology is utilized, such as, the Chinese patent application No. 03210775.7, entitled as "laser-diode-pump picosecond active mode-locked solid planar waveguide laser device". Because the technology of waveguide is developed prematurely and the yield is very low, it is difficult to produce mode-locked picosecond laser device in large scale, and such active mode-locked has low stability performance. There is another existing mode-locked picosecond laser device technology, a passive mode-locked technology used for realizing low-repetition-frequency, such as Chinese utility model application No. 200520000394.7, entitled as "cavity-dumped all-solid-state picosecond laser device", wherein Pockels cell is used to realize cavity-dumped giant laser pulse oscillations, which significantly damages the SESAM, and such damage can not be restored once occurring.

In addition, confocal structure is popularly used in the laser cavity of the existing laser device technology. Although such structure is stable, the cavity is relatively longer with the structure incompact.

To sum up, the existing technologies are lack of a low-repetition-frequency passive mode-locked picosecond laser with compact structure and stable performance.

SUMMARY OF THE INVENTION

Aiming to the defects of the existing technologies, the present invention provides a stable performance, small size, low-repetition-frequency passive mode-locked picosecond laser device. In order to achieve above objects, the present invention adopts the following technical solution.

In the embodiment of the present invention, it is provided a passive mode-locked picosecond laser device including a pump source, laser crystal, a laser cavity, and a mode-locked output structure.

The pump source is placed at the side of the incidence end of the laser crystal, so as to pump the laser crystal.

The laser cavity includes a plane reflective mirror and a first plano-concave mirror, wherein the plane reflective mirror is placed at the position of focal radius of the first plano-concave mirror and opposite to the first plano-concave mirror, with a small angle formed between the normal line of the plane mirror and the axis of the first plano-concave mirror.

The laser generated by the laser crystal oscillates within the laser cavity, and is mode-locking output through the mode-locked output structure.

According to the passive mode-locked picosecond laser device mentioned above, the angle between the normal direction of the plane reflective mirror and the axis of the first plano-concave mirror is $\theta$, where $0°<\theta<1°$.

According to the passive mode-locked picosecond laser device, the laser crystal is embedded in the first plano-concave mirror.

According to the passive mode-locked picosecond laser device mentioned above, the first plan-concave mirror includes a gap where the laser crystal is placed, and the exit end surface of the laser crystal is located inside the arc surface of the plano-concave mirror.

According to the passive mode-locked picosecond laser device above-mentioned, the mode-locked output structure includes a plane output mirror, a second plano-concave mirror and a semiconductor saturable absorber wherein the plane output mirror is semi-transparent semi-reflective mirror which is used to receive the laser from the laser crystal and reflect a part of the laser to the second plano-concave mirror. The second plano-concave mirror reflects the laser coming from the plane output mirror to perpendicularly enter the semiconductor saturable absorber.

According to the passive mode-locked picosecond laser device, the mode-locked output structure includes the second plano-concave mirror, the semiconductor saturable absorber, a polarizer, a ¼ wave plate and a 45° reflective mirror. The polarizer receives the laser from the laser crystal, and reflects it to the second plano-concave mirror through the ¼ wave plate. The second plano-concave mirror is used to receive the laser reflected by polarizer and reflect it to perpendicularly enter the semiconductor saturable absorber. The 45° reflective mirror receives the laser which is reflected back by the semiconductor saturable absorber, passes through the second plan-concave mirror and the ¼ wave plate and is output from the polarizer, and the 45° reflective mirror reflects the laser of as the output.

According to the passive mode-locked picosecond laser device, the laser crystal is Nd:YVO4 or Nd:GdVO4, whose size is 5 mm×5 mm×(3 mm~5 mm).

According to the passive mode-locked picosecond lasers, the radius of the first plano-concave mirror is between 150 mm~800 mm.

According to the passive mode-locked picosecond laser device, the incident end surface of the laser crystal is coated with the thickening film at the pump light wavelength and the high reflective film at the output light wavelength and the export end surface is coated with thickening film at the output light wavelength.

According to the passive mode-locked picosecond laser device, it also includes a focusing mirror which is placed between the pump source and the laser crystal for converging the pump light from the pump source to the laser crystal.

Compared with the existing technologies, the present invention innovatively uses a equivalent confocal stable cavity, increasing the optical path, reducing the repetition frequency, and greatly decreasing the cavity length and volume.

Also, the laser crystal is placed in the gap of the laser cavity or embedded in the end of the laser cavity, resulting in the structure more compact.

BRIEF DESCRIPTION OF THE DRAWINGS

The drawings herein are used to provide a better understanding of the present invention, and constitute a part of this application. The embodiment of the present invention and the description thereof are used for explaining the present invention, and do not improperly limit this invention, in which.

DESCRIPTION OF THE PREFERRED EMBODIMENTS

Figure 1:
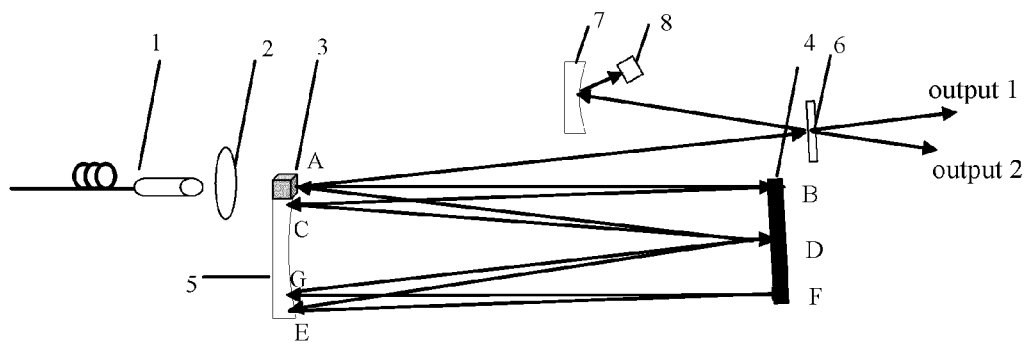
FIG. 1 shows a top view of the passive mode-locked picosecond laser device according to Embodiment 1 of the present invention.

The present invention will be described in detail, referring to the drawings and in conjunction with the embodiment.

Embodiment 1

As shown in FIG. 1, the passive mode-locked picosecond laser device according to Embodiment 1 of the present invention comprises: a LD pump source 1, a focusing lens 2, a laser crystal 3, a plane reflective mirror 4, a first plano-concave mirror 5 ($\Phi$=20 mm), a plane output mirror 6, a second plano-concave mirror 7 ($\Phi$=10 mm) and a SESAM (semiconductor saturable absorber) 8. The LD pump source 1 is placed at the side of the incidence end of the laser crystal 3 for pumping the laser crystal. The focusing mirror 2 is placed between the pump source 1 and the laser crystal 3 for converging the pumping light coming from the pump source 1 into the laser crystal 3, increasing the utilization rate of the pumping light. The plane reflective mirror 4 is placed opposite to the first plano-concave mirror 5 and located at the position of the focal radius of the first plano-concave mirror 5, both of which constitute together a laser cavity (an equivalent confocal cavity). The normal direction of the plane reflective mirror 4 and the axis (along of the horizontal direction) of the first plano-concave mirror 5 form a small acute angle therebetween with the acute angle being of $\theta$ ($0°<\theta<1°$), such that the light incident upon the plane reflective mirror 4 will not be returned back along the original path, but reflected with an small angle of $2\theta$.

Figure 2:
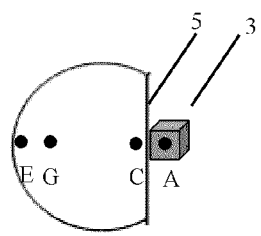
FIG. 2 shows a right view of the first plano-concave mirror of the passive mode-locked picosecond laser device according to Embodiment 1 of the present invention.

As shown in FIG. 2, the first plano-concave mirror 5 is polished thereon to form an arc with 3 mm-5 mm height, so as to have one gap. The laser crystal 3 is placed at the gap, abutting the first plano-concave mirror 5. The export end surface of the laser crystal 3 and the first concave mirror 5 are placed in a substantially same arc surface, or it is possible to "embed" the laser crystal 3 in the end of the laser cavity (the first plano-concave mirror 5), in order to save space. Although FIG. 2 shows a schematic view of the polished gap, but the gap can be embodied in other forms as long as it can appropriately receive the laser crystal 3. The size of the laser crystal is 5 mm×5 mm×(3 mm~5 mm). The incident end surface of the laser crystal is coated with the thickening film at pumping light wavelength (808 nm) and the high reflective film at the output light wavelength (1064 nm) and the export end surface is coated with the thickening film at the output light wavelength (1064 nm). In the present embodiment, the laser crystal 3 can use Nd:YVO4, Nd:GdVO4, and the angular cutting of the laser crystal is implemented by the method of vertical polarization light output cutting. In other cases, if the polarized light output not required, it can also be used the Nd:YAG crystal and so on. The laser crystal 3, after being wrapped at its side with indium platinum, is placed into a heat sink copper block (not shown), held in the gap by a support (not shown), and subjected to a temperature control by water-cooling or TEC (semiconductor cooling chip). Because the laser crystal 3 is "embedded" in the first plano-concave mirror, the laser crystal 3 forms a part of the laser cavity, thus the laser cavity structure is more compact.

In addition, in the present embodiment, the plane output mirror 6, the second plano-concave mirror 7, and the SESAM 8 constitute the mode-locked output structure whose placement position can be calibrated by laser with the calibration process as follows: a laser beam, parallel to the normal of the first plano-concave mirror 5, is incident upon the plane reflective mirror 4 from the center of the laser crystal 3; a plane output mirror 6 is placed on the export optical path of the light beam which has been continuously reflected by the equivalent confocal cavity; and a second plano-concave mirror 7 is used to receive the laser reflected by the plane output mirror 6 and reflected it to perpendicularly enter the SESAM 8. Such calibration is merely an exemplary method for determining the position of the plane output mirror 6, the second plano-concave mirror 7 and the SESAM 8. Those skilled in that art should understand that the mode-locking output structure can be provided in a modified manner, as long as the laser mode-locked output can be achieved.

The passive mode-locked picosecond laser device of the present embodiment is operated as follows:

The LD-pump source 1 emits 808 nm pumping laser which is perpendicularly incident on the focusing mirror 2 focuses the laser, after which the focused laser perpendicularly enters the incident end surface of the laser crystal 3 so as to pump the laser crystal. The pumping light excites the crystal working materials, reversing its particle number, such that a large number of particles are accumulated, inducing an excited radiation. When the light generated by the stimulated emission is reflected multiple times in the laser cavity and then reflected by the incident surface of the laser crystal 3 to the plane output mirror 6—and further is reflected to the second plano-concave mirror 7, and the laser after being reflected by the SESAM 8 is incident on the plane output mirror 6 through the second concave mirror 7, and is output from the plane output mirror 6. In the present embodiment, the light generated by the stimulated emission travels back and forth for 8 times in the equivalent confocal cavity constituted by the plane reflective mirrors 4 and the $\Phi$20 mm plano-concave mirror, that is, the beam is transmitted in the order of A-B-C-D-E-F-G-D-A, and then reflected through the incident end surface of the laser crystal 3 to the plane output mirror; and then reflected through the plane output mirror 6 to the second plano-concave mirror 7, and then is focused onto the SESAM 8, realizing the picosecond laser mode-locked.

In addition, the plane output mirror 6 used in this system is a semi-transparent semi-reflective mirror, which can partly perform the reflection and partly the transmission, such that the system realizes dual-output, and the transmittance rate of the plane output mirror 6 is 5%-15% with the angle provided for ensuring that the incident angle of the laser received from the laser crystal 3 is smaller than 30°, which is used to achieve a small angle reflection and small loss. After the laser realizes the resonance mode-locked, during the process of oscillation, a part of the laser directed from the laser crystal 3 is transmitted out as the output 1, a part of the laser directed from the second plano-concave mirror 7 is transmitted out as the output 2, as a result the dual path mode-locked picosecond output is realized. This dual-output laser can be used to achieve the signal light amplification, obtaining frequency doubling laser output.

Embodiment 2

Figure 3:
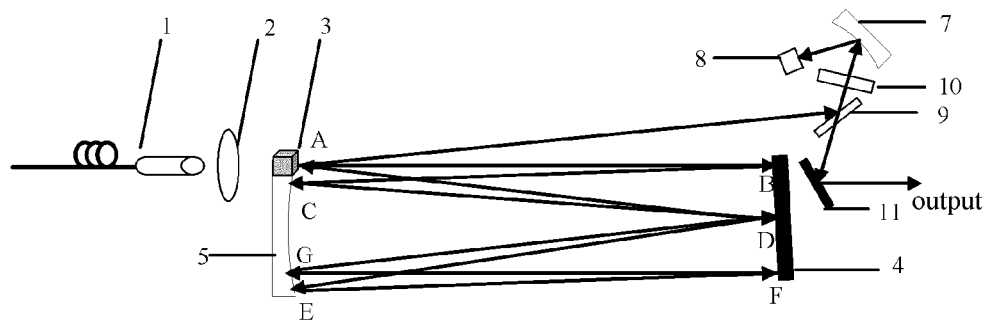
FIG. 3 shows a top schematic view of the passive mode-locked picosecond laser device according to Embodiment 2 of the present invention.

As shown in FIG. 3, the passive mode-locked picosecond laser device according to Embodiment 2 of the present invention comprises a LD pump source 1, a focusing lens 2, a laser crystal 3, a plane mirror 4, a first plano-concave mirror 5, a second plano-concave mirror 7, a SESAM 8, a polarizer 9, a ¼ wave plate 10, and a 45° reflector 11. In this embodiment, the LD pump source 1, the focusing mirror 2, the laser crystal 3, the plane mirror 4 and the first plano-concave mirror 5 are arranged as same as Embodiment 1.

The second plano-concave mirror 7, the SESAM 8, the polarizer 9, the ¼ wave plate 10 and the 45° reflector 11 constitute the mode-locked output structure which is placed on a position capable of being calibrated through laser. The calibration process is as follows: a laser beam is directed parallel to the normal of the first plano-concave mirror 5 from the center of the laser crystal 3 toward the plane reflective mirror 4. The polarizer 9 is placed on the outgoing path of the laser after being continuously reflected by the equivalent confocal cavity, this beam is reflected to the second plano-concave mirror 7 through the ¼ wave plate 10, the second plano-concave mirror 7 is used to receive the laser reflected by the polarizer 9 and reflects the laser which is perpendicularly incident on the SESAM 8, and the 45° reflective mirror 11 receives the laser which is reflected back from the SESAM 8 and exited from the polarizer 9 through the second plano-concave mirror 7 and the ¼ wave plate 10, and reflects the laser as the output. Such calibration is merely a method used for determining the location of the second plano-concave mirror 7, the SESAM 8, the polarizer 9, the ¼ wave plate 10 and the 45° reflective mirror 11. Those skilled in the art should understand that the arrangement of the mode-locked output structure could be appropriately changed, as long as the mode-locked output of laser can be achieved.

In the present embodiment, the laser crystal 3 may be embodied as Nd:YVO4, Nd:GdVO4, and the crystal angular cutting may be performed in the method of perpendicular polarization light output cutting. Therefore, the laser crystal 3 outputs perpendicular polarized light which travels back and forth 8 times in the equivalent confocal cavity composed of the plane reflective mirror 4 and the first plano-concave mirror 5, and is reflected by the incident end surface of the laser crystal to the polarizer 9; the laser is reflected by the polarizer 9 (the normal direction and the incident light beam are arranged with a Brewster angle (roughly equal to 57°) therebetween), perpendicularly goes through the ¼ wave plate 10 after which and the laser becomes a circularly polarized beam which is then focused by the second plano-concave mirror 7 onto the SESAM, so as to achieve the picosecond laser mode-locked (wherein, the focal length of the second plano-concave mirror 7 is 10 mm and surface size of the SESAM is 3 mm×3 mm). The beam is reflected by the SESAM 8 and returned along the original path, and then is reflected by the second plano-concave mirror 7 and perpendicularly passes through the ¼ wave plate 10, so that the circularly polarized light is changed to horizontal polarized light which is transmitted and output through the polarizer 9 and then is reflected by the 45° reflective mirror 11, resulting in horizontally exiting along the system path, so as to achieve the picosecond mode-locked horizontal polarized light output, reducing the system size and facilitating the mechanical structure design.

Figure 4:
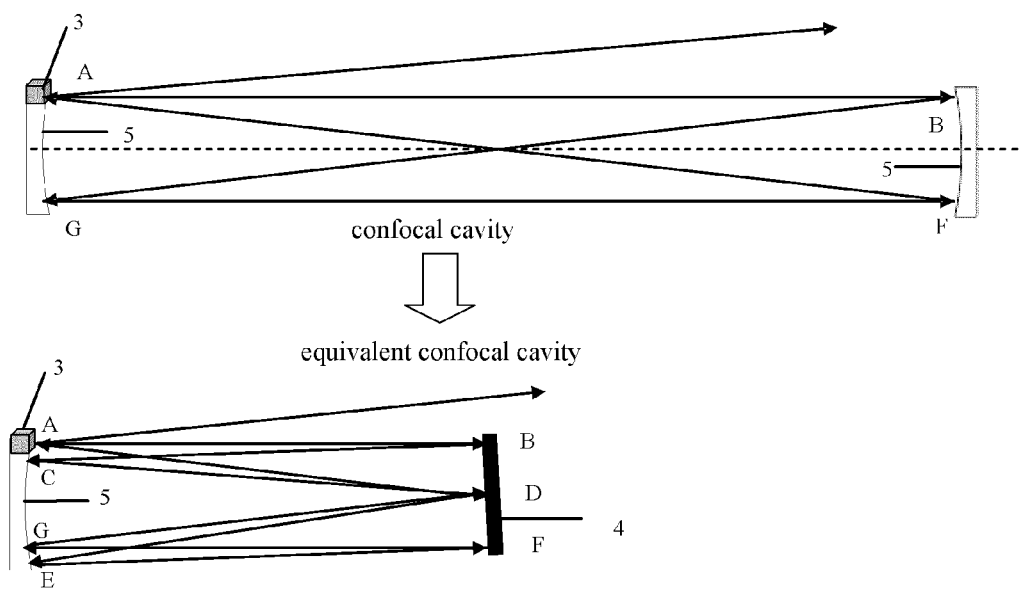
FIG. 4 shows a comparison chart between the beam transmitting in the confocal cavity and in the equivalent confocal cavity of the passive mode-locked picosecond laser device according to embodiment of the present invention.

FIG. 4 is a view showing the comparison between the beam transmitted in the confocal cavity used in the existing technology and in the equivalent confocal cavity of the passive mode-locked picosecond laser device according to the embodiment of the present invention. From the figure it can be seen that the beam travels back and forth 8 times in the equivalent confocal cavity constituted by the plane reflective mirror and the first plano-concave mirror ($\Phi$=20 mm) wherein the curvature radius of the first plano-concave mirror 5 can be between 150 mm and 800 mm and the diameter is 20 mm. Therefore, the total optical path length of the picosecond laser resonance cavity having the equivalent confocal cavity is 1 m~6 m, and the repetition frequency of the picosecond pulse is 25 MHz~150 MHz. In the case that the volume of this equivalent confocal cavity is half of the confocal cavity, the optical path length of the equivalent confocal cavity is substantial equal to that of the confocal cavity, realizing the low-repetition-frequency, and furthermore such equivalent confocal cavity has properties of a stable cavity and stable performance.

The present invention innovatively uses the stable resonator cavity design of the equivalent confocal cavity, increasing the optical path, decreasing the repetition frequency and significantly reducing the length and volume of the cavity. Furthermore, in the present invention, the laser crystal, as a part of the laser cavity, is "embedded" in the end of the laser cavity, significantly saving the space and making the structure of the laser device more compact.

While the invention has been disclosed in connection with the preferred embodiments shown and described in detail, various modifications and improvements made to the present invention will become readily apparent to those skilled in the art. Within the spirit and principle of the present invention, any changes, equivalent replacements, improvements etc. should be included in the scope of protection the present invention protects.

What is claimed is:

1. A passive mode-locked picosecond laser device, wherein it comprises a pump source, a laser crystal, a laser cavity and a mode-locked output structure, wherein the pump source is provided at the incident end surface of the laser crystal, for pumping the laser crystal;

the laser cavity comprises a plane reflective mirror and a first plano-concave mirror wherein the plane reflective mirror is placed opposite to the concave surface of the first plano-concave mirror and located on the position of the focal radius of the first plano-concave mirror, and the normal direction of the plane reflective mirror and the axis of the first plano-concave mirror form a small angel therebetween; and the laser light emitted by the laser crystal oscillates in the laser cavity and is mode-locked output through the mode-locked output structure, wherein the laser crystal is embedded in the first plano-concave mirror, and wherein the angle between the normal direction of the plane reflective mirror and the axis of the first plano-concave mirror is θ, where $0°<θ<1°$, wherein the mode-locked output structure comprises a second plano-concave mirror, a semiconductor saturable absorber, a polarizer, a ¼ wave plate and a 45° reflective mirror wherein the polarizer receives the laser light from the laser crystal, and reflects it to the second plano-concave mirror through the ¼ wave plate;

the second plano-concave mirror is used for receiving the laser light reflected by the polarizer, and reflecting the laser light which is then made to be perpendicularly incident on the semiconductor saturable absorber, the 45° reflective mirror receives the laser light which is reflected back from the semiconductor saturable absorber and output from the polarizer through the second plano-concave mirror and the ¼ wave plate, and reflects the laser light as the output.

2. The passive mode-locked picosecond laser device according to claim 1 wherein the first plano-concave mirror includes a gap where the laser crystal is placed, and the exit end surface of the laser crystal is located inside the arc surface of the first plano-concave mirror.

3. The passive mode-locked picosecond laser device according to claim 1 wherein the mode-locked output structure comprises a plane output mirror, a second plano-concave mirror and a semiconductor saturable absorber, wherein the plane output mirror is a semi-transparent semi-reflective mirror which is used for receiving the laser from the laser crystal and reflecting a part of the laser to the second plano-concave mirror;

the second plano-concave mirror reflects the laser coming from the plane output mirror and makes the laser perpendicularly incident on the semiconductor saturable absorber.

4. The passive mode-locked picosecond laser device according to claim 1 wherein the laser crystal is Nd:YVO4 or Nd:GdVO4, whose size ranges from 5 mm×5 mm×3 mm to 5 mm×5 mm×5 mm.

5. The passive mode-locked picosecond laser device according to claim 1 wherein the curvature radius of the first plano-concave mirror is between 150 mm and 800 mm.

6. The passive mode-locked picosecond laser device according to claim 1 wherein the incident end surface of the laser crystal is coated with a thickening film at the pumping light wavelength, and a high reflective film at the output light wavelength, and the exit end surface thereof is coated with the thickening film at the output light wave length.

7. The passive mode-locked picosecond laser device according to claim 1 wherein it also comprises:

a focusing lens which is placed between the pump source and the laser crystal to converge the pumping light from the pump source to the laser crystal.

* * * * *